United States Patent [19]
Saunders et al.

[11] Patent Number: 6,078,112
[45] Date of Patent: Jun. 20, 2000

[54] COMPUTER BAY MODULAR ADAPTER

[75] Inventors: Scott P. Saunders, Spring; Robert E. Krancher, Houston, both of Tex.

[73] Assignee: Compaq Computer Corporation, Houston, Tex.

[21] Appl. No.: 08/989,702

[22] Filed: Dec. 12, 1997

[51] Int. Cl.[7] .................................................. H02J 1/00
[52] U.S. Cl. ...................................... 307/125; 307/116
[58] Field of Search .................................. 307/112, 113, 307/116, 125, 126, 130, 131, 43, 80, 85; 361/18, 79, 86, 87, 91; 395/280, 282–284

[56] References Cited

U.S. PATENT DOCUMENTS

| | | | |
|---|---|---|---|
| 5,149,945 | 9/1992 | Johnson et al. | 235/380 |
| 5,471,099 | 11/1995 | Larabell et al. | 307/53 |
| 5,572,395 | 11/1996 | Rasums et al. | 361/58 |
| 5,727,221 | 3/1998 | Walsh et al. | 395/750 |
| 5,847,543 | 12/1998 | Carroll | 320/125 |
| 5,898,844 | 4/1999 | Thompson | 395/283 |
| 5,910,690 | 6/1999 | Dorsey et al. | 307/141 |
| 5,948,074 | 9/1999 | Ninomiya | 710/2 |
| 5,955,797 | 9/1999 | Kim | 307/150 |
| 5,978,821 | 11/1999 | Freeny | 708/100 |

*Primary Examiner*—Fritz Fleming
*Attorney, Agent, or Firm*—Konneker & Smith, P.C.

[57] ABSTRACT

Apparatus is provided for adapting a computer system having a standard half-height bay to operatively receive multi-purpose bay devices therein. In one described embodiment, an adapter is provided which may be conveniently mounted in a standard half-height bay, but which is configured to accept multi-purpose bay devices. The adapter includes standard drive connectors, and connectors which permit the adapter to be effectively used in systems having features such as circuitry permitting hot-swapping of drives and circuitry for controlling battery charging and/or discharging. The adapter also includes circuitry for automatic selection of a power source to supply power to devices installed therein.

16 Claims, 7 Drawing Sheets

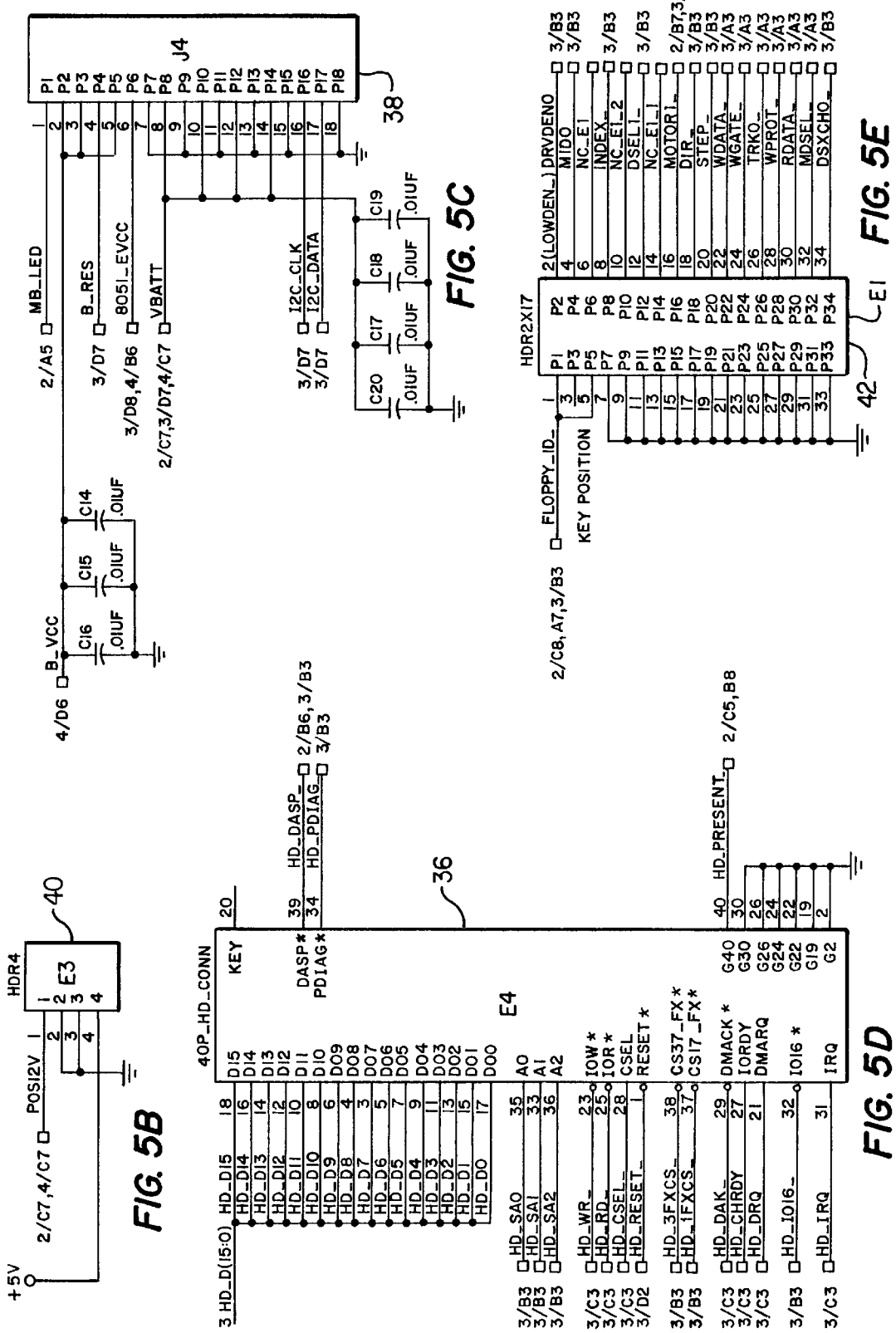

COMPUTER BAY MODULAR ADAPTER

CROSS-REFERENCE TO RELATED APPLICATIONS

This application is related to application Ser. Nos. 08/735,673 (now U.S. Pat. No. 5,933,321), and 08/735,753 (now U.S. Pat. No. 5,764,481), each filed Oct. 23, 1996. The disclosures of these applications are incorporated herein by this reference.

BACKGROUND OF THE INVENTION

1. Field of the Invention

The present invention generally relates to computer systems and, in a described embodiment thereof, more particularly relates to multi-purpose bays utilized in computer systems.

2. Description of Related Art

A modern notebook computer is provided with a multi-purpose bay for operatively receiving therein a variety of devices. In general, these devices may include a battery, storage media drives, such as a floppy disk drive, hard disk drive, magneto-optical disk drive, tape drive, etc., and other devices (herein collectively referred to as "multi-purpose devices"). The multi-purpose bay greatly enhances the capabilities of the notebook computer, in particular in that the computer is able to use a variety of devices without requiring a large amount of space in which to mount each of the devices. Where the device used in the multi-purpose bay is a battery, the computer is able to run for longer periods of time on battery power and, when connected to an AC power source, more than one battery may be charged at a time.

Where a multi-purpose bay is provided in a notebook computer, storage media devices may be "hot swappable" in the bay, that is, the devices may be inserted, removed and interchanged without the need for turning off power to the computer. In contrast, a typical desktop, tower, or other non-portable computer does not include the "hot-swappable" storage media devices feature. Thus, while the notebook computer may have internal circuitry which permits hot-swapping of storage media devices, the non-portable computer typically does not include this circuitry.

Other circuitry may be present in a notebook computer which circuitry is not also present in a typical non-portable computer. For example, since the notebook computer is designed to operate on battery power, it may include circuitry which senses the state of charge of the battery, optimizes the rate of battery charging and discharging, etc. A non-portable computer, or any computer system not designed to operate on battery power, may not include this circuitry.

However, it would be very advantageous to be able to used the devices designed for use in a notebook computer multi-purpose bay in other computer systems. For example, a computer user could transfer a large amount of data from a notebook computer to a desktop computer very conveniently by recording the data on a hard disk drive device installed in the notebook computer's multi-purpose bay, and then removing the hard disk drive from the notebook computer and installing it in the desktop computer. As another example, a battery device designed for use in the notebook computer multi-purpose bay could be installed and charged in a docking station equipped with an appropriate multi-purpose bay and the circuitry required to charge the battery.

Unfortunately, desktop computers and other non-portable computer system generally do not include multi-purpose bays. Instead, they are typically provided with one or more conventional half-height bays in which storage media drives may be more or less permanently mounted. Therefore, what is needed is an adapter to convert a conventional half-height bay into a multi-purpose bay. Additionally, since the computer system may or may not include a hot-swappable feature for storage media devices installed therein, the adapter should be usable with both types of systems. Furthermore, since the computer system may or may not include circuitry for charging or discharging a battery device, the adapter should be capable of sue with either type of system.

SUMMARY OF THE INVENTION

In carrying out principles of the present invention, in accordance with a described embodiment thereof, an adapter is provided for converting a standard half-height bay into a multi-purpose bay. The adapter is usable in a variety of computer systems, including those in which drives may be hot-swapped, those in which drives may not be hot-swapped, those which include circuitry for charging and/or discharging batteries, and those which do not have provisions for using batteries therewith.

In one aspect of the present invention, a multi-purpose bay adapter is provided which has outer envelope dimensions compatible with mounting characteristics for a standard half-height bay. In this manner, the adapter may be conveniently mounted in any computer system having a standard half-height bay. Additionally, the adapter has a multi-purpose bay therein for operatively accepting devices designed for use in multi-purpose bays. Appropriate connectors are provided in the adapter for connecting to the devices.

In another aspect of the present invention, a multi-purpose bay adapter is provided which includes connectors conventionally used to connect standard devices, such as half-height disk drives and tape drives, to non-portable computer systems, and which also includes connectors for connecting multi-purpose bay devices to computer systems having circuitry permitting hot-swapping of devices, and to computer systems having circuitry for controlling battery charging and/or discharging. In one described embodiment, the adapter is installed in a half-height bay of a docking station, wherein the docking station includes circuitry permitting hot-swapping of devices and circuitry for controlling battery charging.

In a further aspect of the present invention, a multi-purpose bay adapter includes circuitry which senses the environment in which it is installed, and which automatically selects a power source for powering devices installed therein. In this manner, the adapter is usable in a variety of different environments, without requiring intervention of a user to select the appropriate power source.

These and other features, aspects and benefits of the present invention will become apparent upon consideration of the written description below and the accompanying drawings.

DETAILED DESCRIPTION

Figure 1:
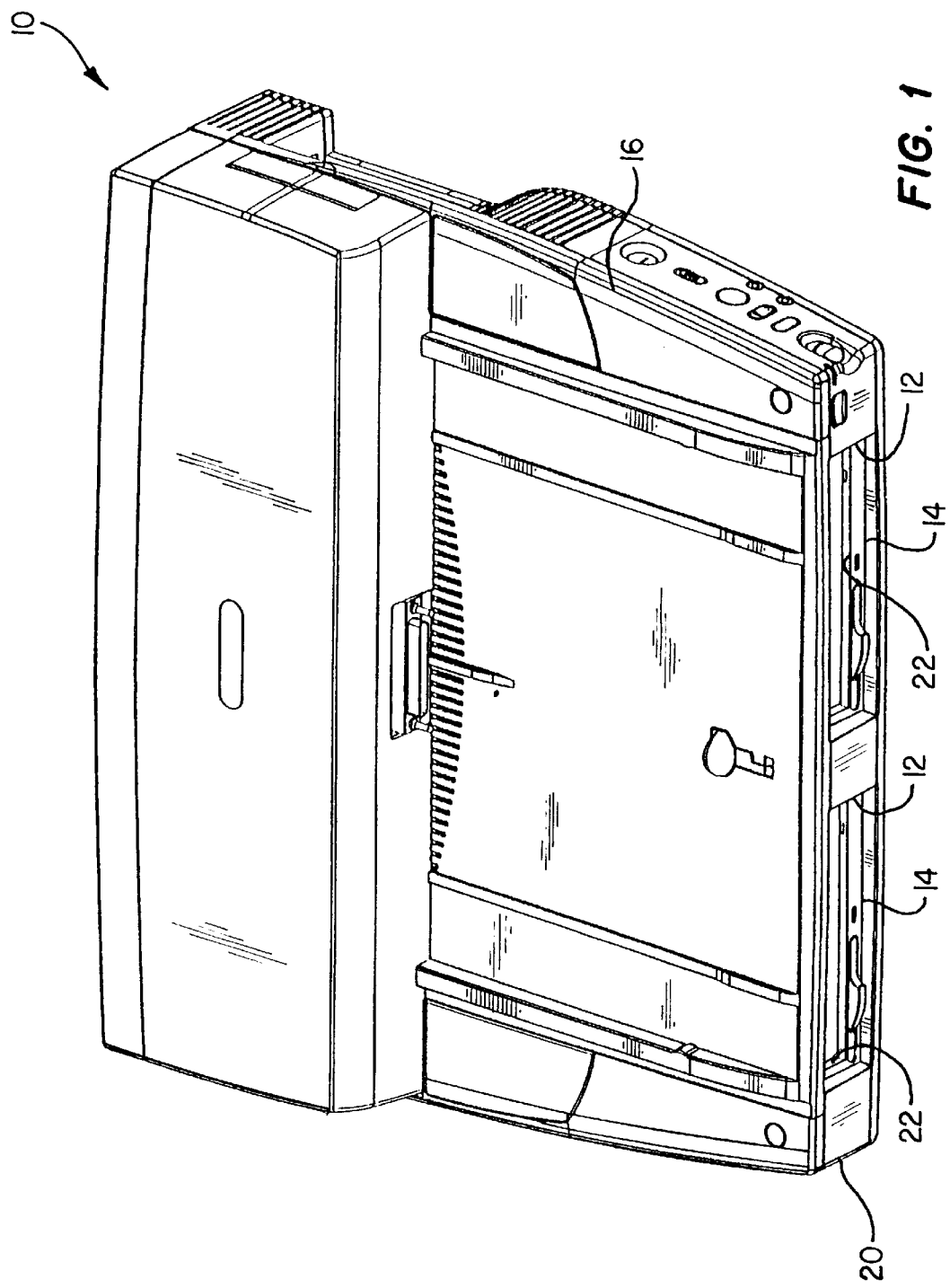
FIG. 1 is a perspective view of a docking station having installed therein two multi-purpose bay adapters embodying principles of the present invention.

Representatively illustrated in FIG. 1 is a docking station 10 embodying principles of the present invention. The docking station 10 is described below as an example of a computer system which includes industry standard half-height bays 12, circuitry for hot-swapping multi-purpose devices, and circuitry for controlling charging and/or discharging of batteries. Such capabilities may be found in commercially available docking stations, such as the ARMADASTATION™ docking station available from Compaq Computer Corporation of Houston, Tex.

The docking station 10 representatively illustrated in FIG. 1 has novel additional capabilities provided by multi-purpose bay adapters 14 operatively installed in the half-height bays 12. As will be more fully described below, the adapters 14 adapt the half-height bays 12, so that they will operatively receive devices therein which are designed for use in multi-purpose bays. These devices are well known to those of ordinary skill in the art, and may include batteries, storage media devices, such as disk drives, tape drives, etc., and other devices.

It is to be clearly understood that the docking station 10 is described herein as an example of a computer system in which the adapters 14 may be operatively installed, and that the adapters 14 may be installed in other computer systems without departing from the principles of the present invention. Such computer systems may or may not include circuitry for hot-swapping of devices, and may or may not include circuitry for charging and/or discharging one or more batteries.

Figure 2:
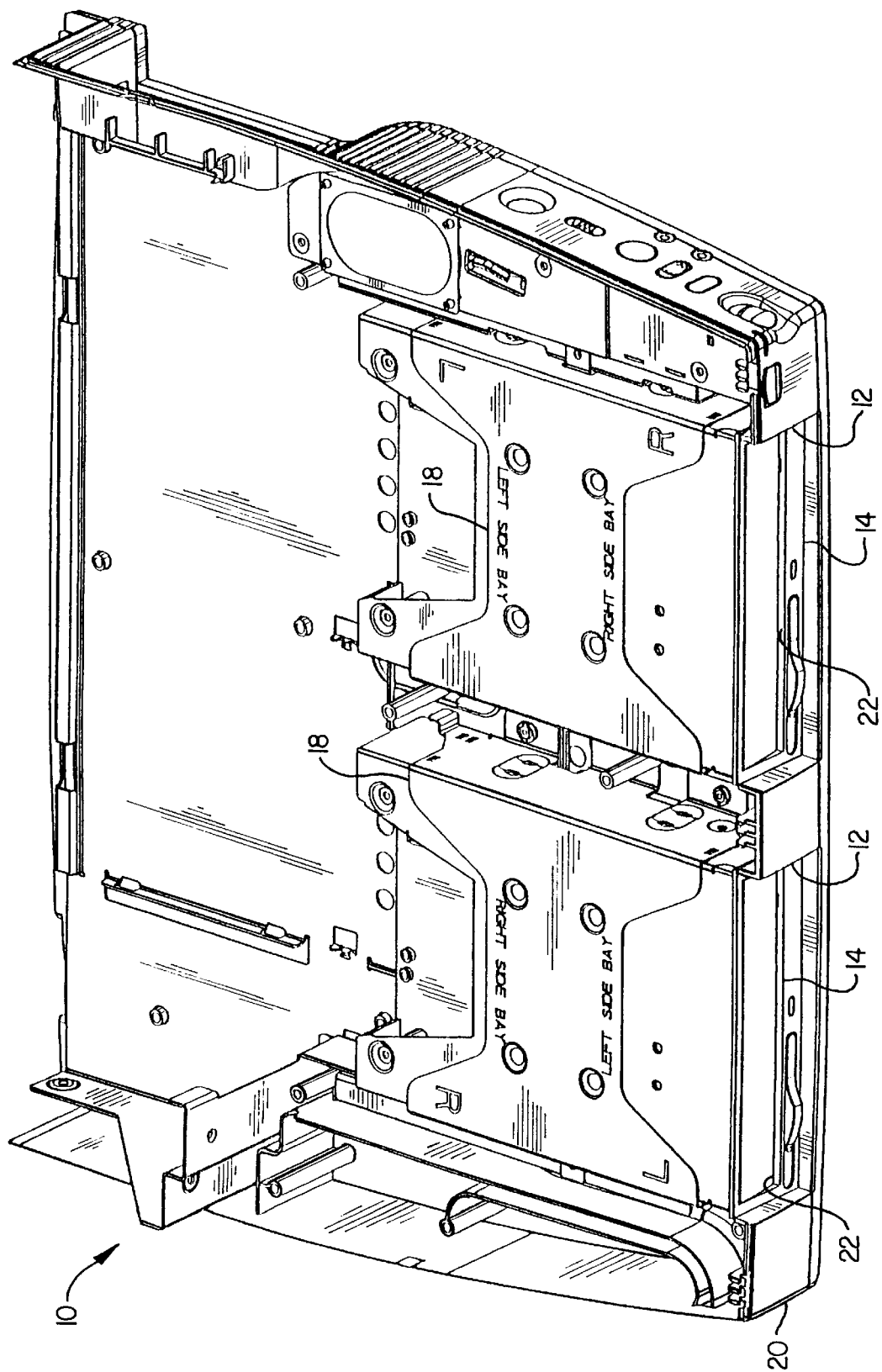
FIG. 2 is a perspective view of the docking station of FIG. 1, with an upper portion removed therefrom, showing mounting details of the adapters.

Referring additionally now to FIG. 2, the docking station 10 is representatively illustrated with an upper cover 16 thereof removed. In this view it may be easily seen that the adapters 14 are mounted within the half-height bays 12 by means of brackets 18. The brackets 18 secure the adapters 14 within a lower housing 20 of the docking station 10.

Figure 3:
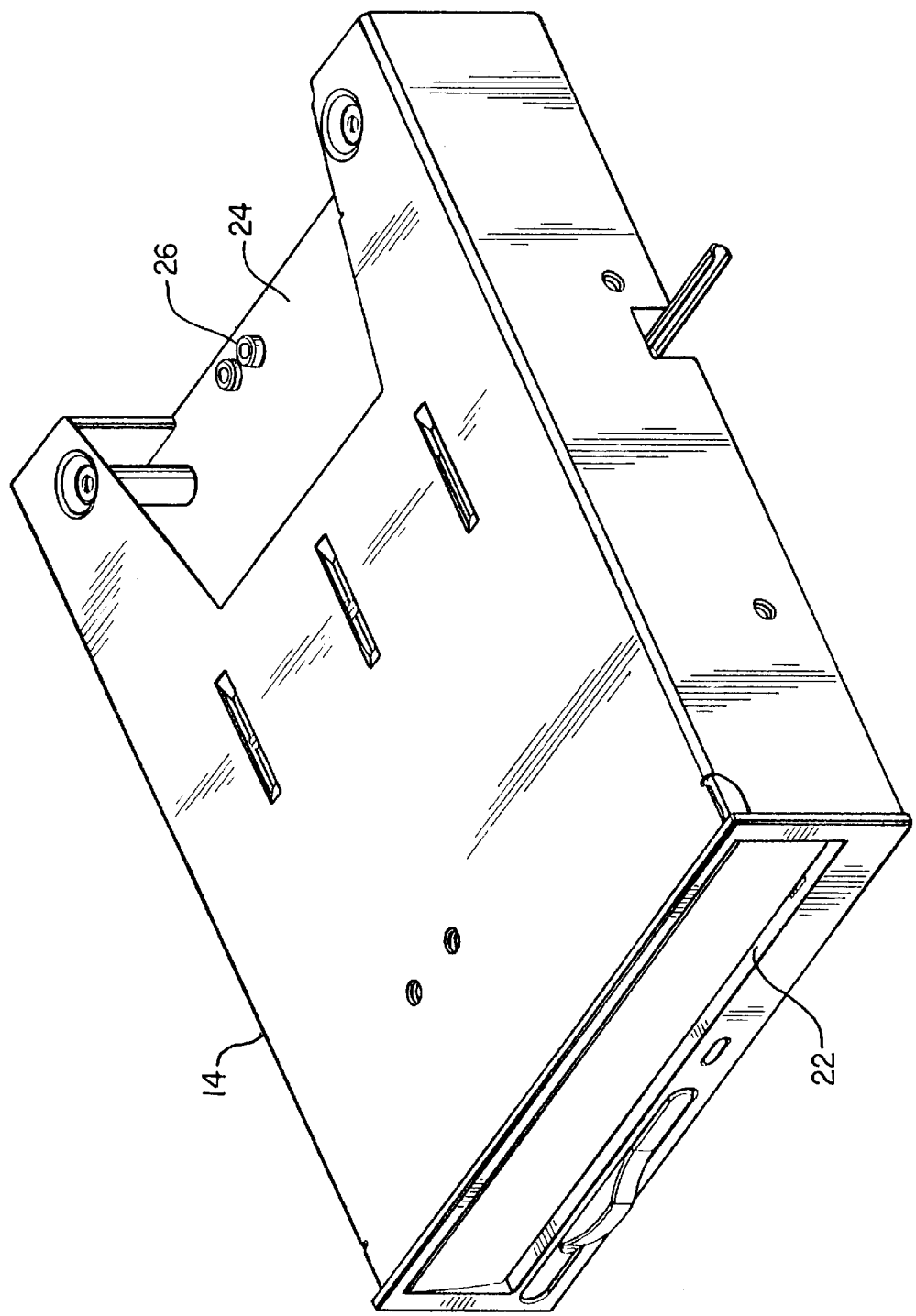
FIG. 3 is a perspective view of one of the adapters.

Referring additionally now to FIG. 3, one of the adapters 14 is representatively illustrated apart from the docking station 10, with its associated bracket 18 removed therefrom. In this view it may be clearly seen that the adapter 14 includes a multi-purpose bay 22 formed therein for insertion of an appropriate multi-purpose device thereinto. Additionally, the adapter 14 includes a rearwardly disposed platform 24 laterally aligned with the multi-purpose bay 22. The platform 24 is provided with an internally threaded boss 26 for securement of a circuit board thereto.

In a manner that will be more fully described below, a multi-purpose device inserted into the bay 22 will operatively interconnect with the circuit board secured to the platform 24. Thus, the adapter 14 permits devices configured for insertion in multi-purpose bays 22 to be used in standard half-height bays 12 of computer systems, such as the docking station 10. For this purpose, the adapter 14 has outer envelope dimensions which correspond to those of industry standard half-height bays 12, but has the multi-purpose bay 22 formed therein, and includes the circuit board described more fully below for operative interconnection of multi-purpose devices to the computer system.

Figure 4:
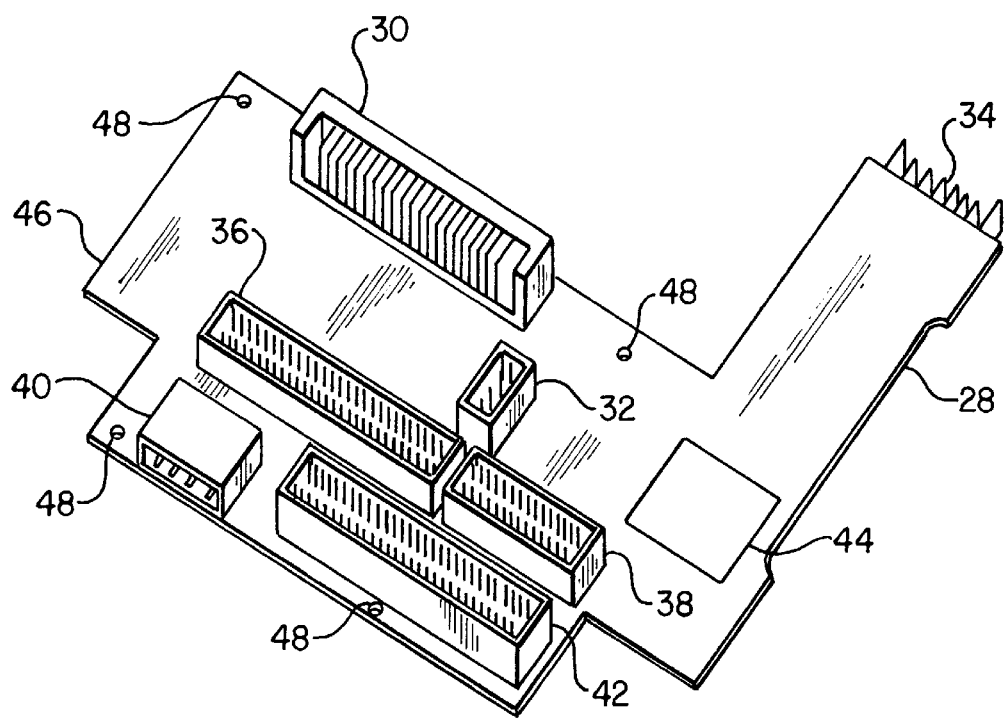
FIG. 4 is a schematic perspective view of a circuit board of the adapters, the circuit board embodying principles of the present invention.

Referring additionally now to FIG. 4, a circuit board 28 embodying principles of the present invention is representatively illustrated. The circuit board 28 includes a variety of connectors 30, 32, 34, 36, 38, 40, 42 and a circuit 44. The circuit 44 is schematically depicted as a block in FIG. 4, but is shown in diagram form in FIG. 6 and is more fully described below.

The circuit board 28 is representatively depicted as including a single rigid planar substrate 46 on which all of the connectors 30, 32, 34, 36, 38, 40, 42 and the circuit 44 are mounted, but it is to be understood that the circuit board may be configured in multiple sections, may have a flexible substrate or substrate portion, etc., without departing from the principles of the present invention.

The circuit board 28 has four mounting holes 48 formed therethrough for mounting to the platform 24 and other portions of the adapter 14 as described above. When properly mounted within the adapter 14, the connectors 30, 34 face toward the multi-purpose bay 22, so that a multi-purpose device inserted into the bay will interconnect with one of the connectors 30, 34. Of course, other arrangements of the connectors 30, 34 with respect to the multi-purpose bay 22 may be utilized without departing from the principles of the present invention.

In the embodiment representatively illustrated in FIG. 4, the connector 30 is a standard multi-purpose bay drive connector, such as that used in conventional notebook computers having multi-purpose bays therein. The connector 30 is a 68-pin connector for interconnecting to storage media devices, such as hard disk drives, floppy disk drives, tape drives, magneto-optical drives, etc. As used in the circuit board 28, the connector 30 is configured for data communication and supplying power to such devices installed in the multi-purpose bay 22 of the adapter 14. The connector 30 is shown diagrammatically in FIG. 5, along with the signal at each pin thereof. Although the connector 30 is described herein as being a standard multi-purpose bay drive connector, it is to be understood that other types of connectors may be used for the connector 30 without departing from the principles of the present invention.

The connector 34 is a standard multi-purpose bay battery connector of the type conventionally used to connect batteries to notebook computers in multi-purpose bays. The connector 34 includes 6 pins, and is shown diagrammatically in FIG. 5, along with the signal at each pin.

As representatively illustrated, the connector 34 is for use with computer systems having circuitry for controlling charging and/or discharging of a battery installed in the multi-purpose bay 22. The docking station 10 includes circuitry for controlling charging of a battery, but does not include circuitry for controlling charging of a battery, since the docking station is designed to operate with an AC power supply. However, it is to be understood that the docking station 10, or any computer station in which the adapter 14 is installed, may or may not include circuitry for controlling discharging of the battery, and may or may not include circuitry for controlling charging of the battery, without departing from the principles of the present invention. For example, use of the adapter 14 with a computer system which does not include circuitry for controlling either charging or discharging of a battery in a multi-purpose bay is described below.

The connectors 32, 36, 40, 42 are conventional connectors of the type used to connect computer systems to drives installed in standard half-height bays, and are well known to those of ordinary skill in the art. Connector 32 is a 4-pin CD audio connector. Connector 36 is a 40-pin IDE data connector. Connector 40 is a 4-pin 5 and 12 volt power connector. Connector 42 is a 34-pin floppy drive data connector. Each of these connectors is shown diagrammatically in FIG. 5, along with the signal at each pin of the connector.

By providing these conventional connectors 32, 36, 40, 42 on the circuit board 28, the adapter 14 is usable in a half-height bay 23 of a computer system having connectors for installation therein of drives designed for use in half-height bays. The conventional half-height-type drive data connectors 36, 42 and CD audio connector 32 are interconnected to the multi-purpose drive connector 30, to thereby permit data transmission between multi-purpose drives installed in the multi-purpose bay 22 and computer systems having connectors designed for use with standard half-height drives. Thus, for example, the floppy disk write data signal WDATA is at pin 59 of connector 30, and at pin 22 of connector 42, and the hard disk write data signal HD_WR is at pin 23 of connector 30, and at pin 23 of connector 36.

The circuit 44 is utilized to sense whether the adapter has been installed in a conventional half-height bay environment, or whether the adapter has been installed in an environment which is designed for use with multi-purpose drive devices. For example, if the adapter 14 is installed in a half-height bay of a standard desktop computer, multi-purpose drive devices inserted into the multi-purpose bay 22 will be supplied power from the computer via the connector 40, but if the adapter is installed in the half-height bay 12 of a computer system, such as the docking station 20, which is designed for use with multi-purpose drive devices, these devices inserted into the multi-purpose bay 22 will be supplied power from the computer via the connector 38. Additionally, if the adapter 14 is installed in a computer system, such as the docking station 10, which includes circuitry for controlling charging and/or discharging of multi-purpose battery devices, these devices will be charged and/or discharged via the connector 38.

Figures 5A, 5G:
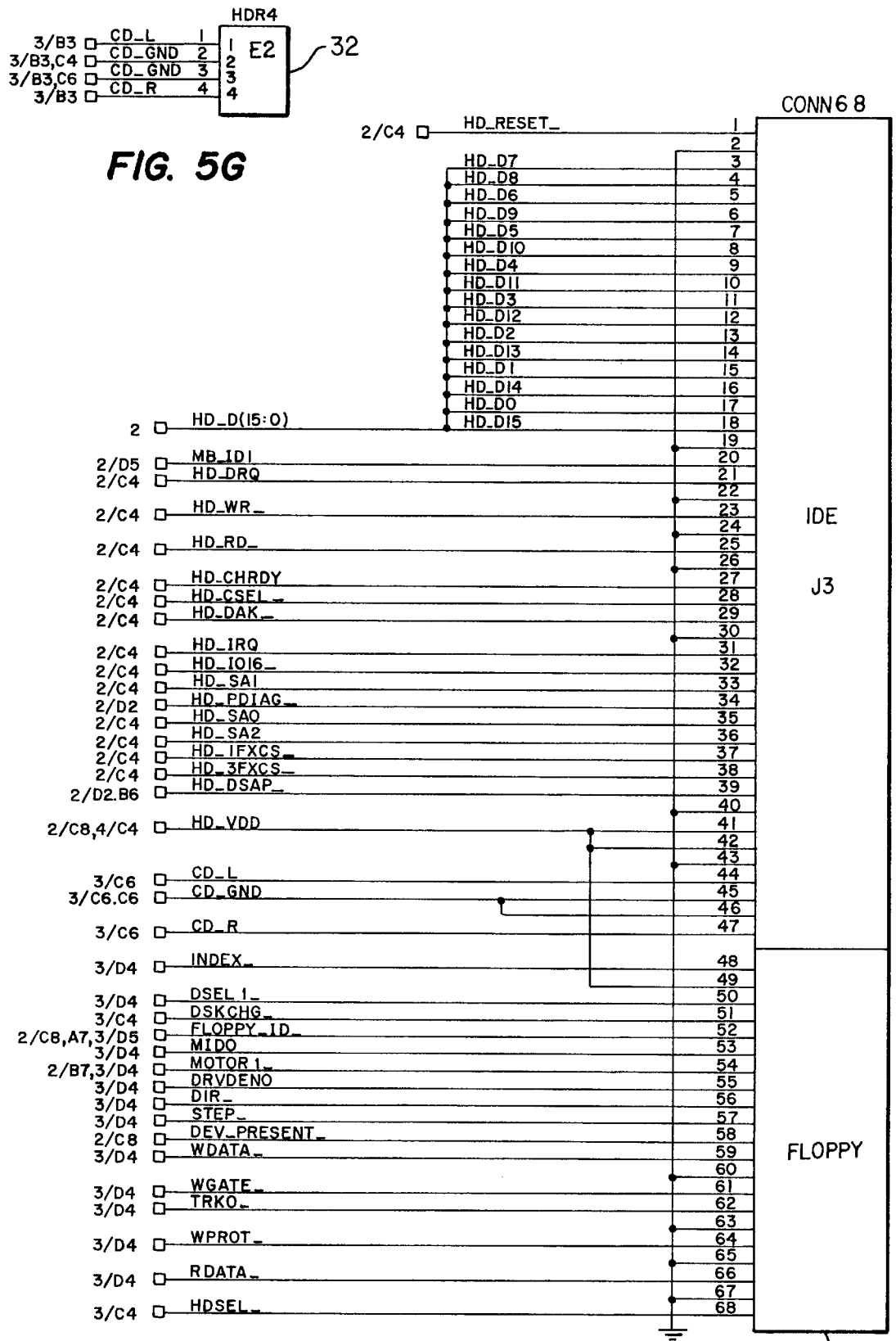
FIG. 5 is a schematic diagram of connectors used on the circuit board of FIG. 4.
Figure 5F:
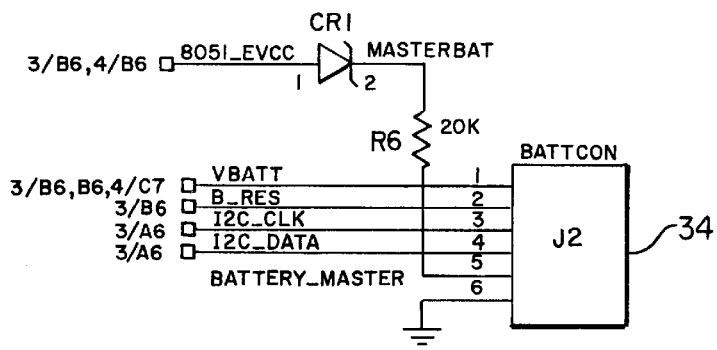

The connector 38 is an 18-pin connector and is shown diagrammatically in FIG. 5, along with the signal at each pin. The connector 38 is connected to the computer system in which the adapter 14 is installed only if that computer system is designed for use with multi-purpose devices, such as the docking station 10. If the computer system is not designed for use with multi-purpose devices, such as a standard desktop computer, the connector 38 is not used. Therefore, the circuit 44 is uniquely designed to sense whether appropriate power has been supplied to the connector 38 (in which case the adapter 14 has been installed in an environment designed for use with multi-purpose devices), or whether appropriate power has been supplied to the connector 40 and not to the connector 38 (in which case the adapter 14 has been installed in an environment designed for use with standard half-height drives and not multi-purpose devices).

Note that some environments in which the adapter 14 may be installed may be designed to permit use of both multi-purpose devices and standard half-height drives. In that case, it would be possible for power to be supplied to both of connectors 38 and 40. The circuit 44 is designed to sense this situation and supply power from the connector 40 or from the connector 38 to the multi-purpose device installed in the bay 22, depending upon the configuration of the circuit, thereby automatically supplying appropriate power to the multi-purpose device, and permitting hot-swapping of drives in the bay where the computer system includes hot-swapping circuitry interconnected to connector 38.

Figure 6:
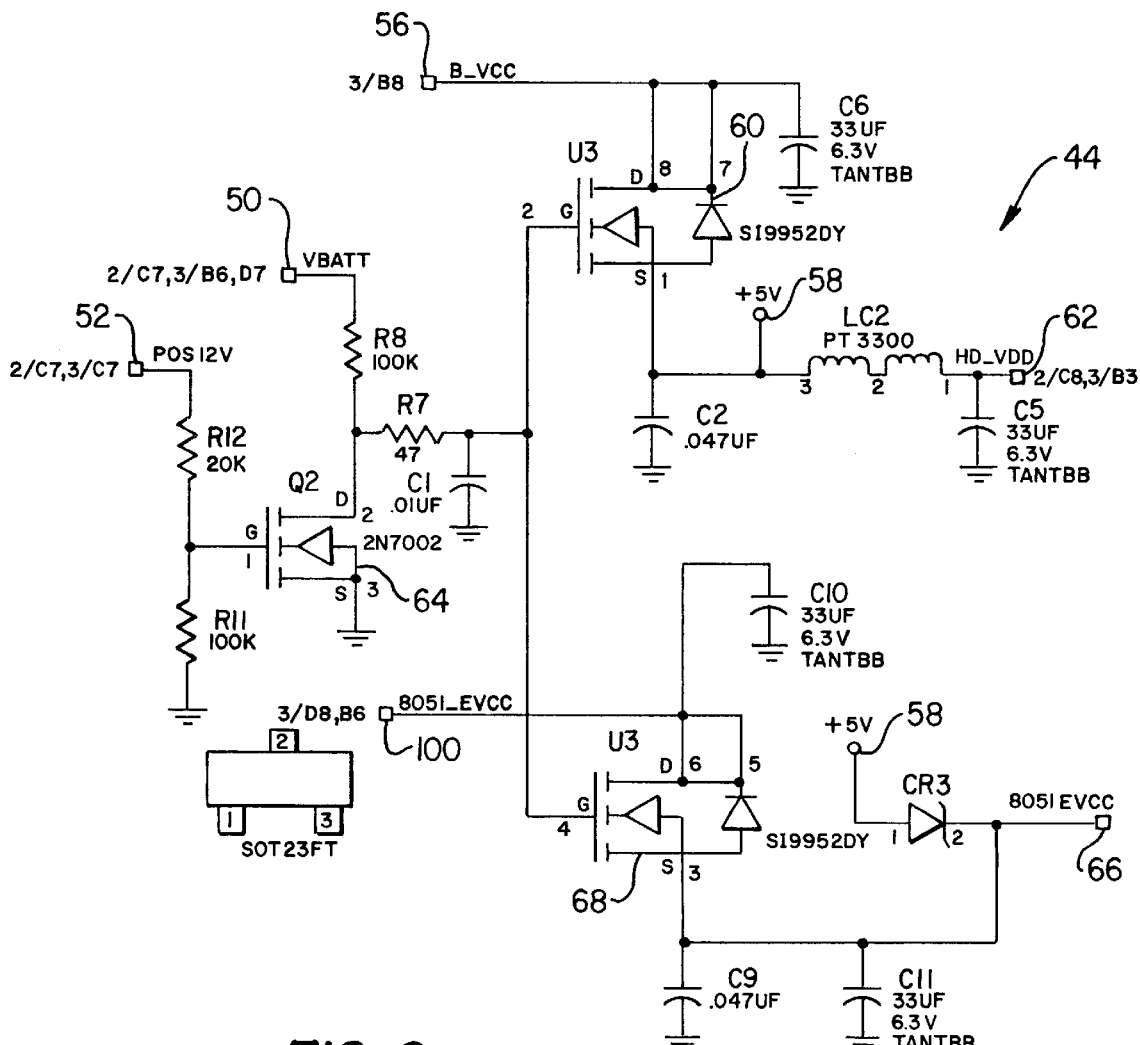
FIG. 6 is a diagram of a circuit on the circuit board of FIG. 4, the circuit embodying principles of the present invention.

Referring additionally now to FIG. 6, a pertinent portion of the circuit 44 is diagrammatically and representatively illustrated. In very basic terms, the circuit 44 senses the presence of one or both of the signals VBATT and POS12V at terminals 50, 52, respectively, and correspondingly supplies power to terminal 62 (HD_VDD) from one of terminals 56 (B_VCC) and 58 (+5 V).

Note that VBATT is at pin 8, and B_VCC is at pin 2, of connector 38. Thus, VBATT will be sensed by the circuit 44 only if the adapter 14 is installed in an environment designed for use with multi-purpose devices, such as the docking station 10, and if the connector 38 is connected to the computer system. Of course B_VCC is only available at terminal 56 if the connector 38 is connected to the computer system.

POS12V is at pin 1, and +5 V is at pin 4 of connector 40. Thus, POS12V will be sensed by the circuit 44 only if the adapter 14 is installed in an environment designed for use with standard half-height drives, such as a standard desktop computer, and if the connector 40 is connected to the computer system. +5 V is only available at terminal 58 if the connector 40 is connected to the computer system.

Some computer systems, such as the docking station 10, may be designed for use with both multi-purpose devices and stand half-height drives. In that case, it is possible for the connector 38 and/or the connector 40 to be connected to the computer system. Thus, POS12V and VBATT may be simultaneously present at terminals 52, 50, respectively, and B_BCC and +5 V may be simultaneously present at terminals 56, 58, respectively.

When connector 38 is connected to the computer system, the computer system must be designed for use with multi-purpose devices (otherwise, there would be no connector therein for connecting to the connector 38). In that case, VBATT is present at terminal 50, and the base of a transistor or gate 60 interconnected between terminals 50, 56 and a terminal 62 goes high, thereby connecting B_VCC to terminal 62 (HD_VDD) and supplying power to a multi-purpose drive installed in the multipurpose bay 22. Note that HD$_{13}$ VDD is also at pin 41 of connector 30.

When connector 40 is connected to the computer system, the computer system must be designed for use with standard half-height drives (otherwise, there would be not connector therein for connecting to the connector 40). In that case, POS12V is present at terminal 52, and the base of a transistor or gate 64 interconnected between terminals 50, 52 and ground goes high. When the base of gate 64 is high, terminal 50 is connected to ground. Recall that terminal 50 is also connected to the base of gate 60. Thus, with terminal 50 connected to ground, terminal 56 is disconnected from terminal 62, and power is supplied to terminal 62 from terminal 58 (+5 V).

When both connectors 38 and 40 are connected to the computer system, the computer system must be designed for use with both standard half-height drives and with multi-purpose devices. In that case, the base of gate 64 will be high, and power will be supplied to terminal 62 from terminal 58 (+5 V). Of course, to permit hot-swapping of multi-purpose drives in the multi-purpose bay 22 (in computer systems having this feature), the signals on terminals 50, 52 may be reversed, such that VBATT is at terminal 52 and POS12V is at terminal 50, and the signals on terminals 56, 58 may be reversed, such that +5 V is at terminal 56 and B_VCC is at terminal 58. In this manner, multi-purpose drives may be installed in, and removed from, the multi-purpose bay 22 without powering down the computer system.

Referring again to FIG. 5, note that connector 38, which is connected to the computer system if the computer system is designed for use with multi-purpose devices, carries the signals also carried by the battery connector 34 (8051_EVCC, VBATT, B_RES, 12C_CLK, 12C_DATA and ground), as well as the signal B_VCC used for powering multi-purpose drive devices. Thus, with the connector 38 connected to the computer system either a battery or a disk drive (or other storage media device) may be utilized with the computer system.

If the connector 40 is connected to the computer system, a battery installed in the multi-purpose bay 22 is not connected to the 8051_EVCC signal on pin 6 of connector 38, nor to the other signals (VBATT, B_RES, 12C_CLK and 12C_DATA) which would otherwise be connected to the battery from connector 38 via connector 34. Instead, when terminal 50 is connected to ground (via the gate 64, as described above), the base of a transistor or gate 68 interconnected between the 8051_EVCC signal at a terminal 100 and terminal 66 goes low and terminal 100 is disconnected from terminal 66. However, power may still be supplied from terminal 58.

Additionally, if only the connector 38 is connected to the computer system, the base of the gate 68 will go high (since it is connected to terminal 50), and terminal 100 will be connected to terminal 66. Thus, power is supplied to terminal 66 no matter whether connector 40 or connector 38, or both of them, is connected to the computer system. Note that, if both connectors 38, 40 are connected to the computer system, terminal 58, but not terminal 100, will be connected to terminal 66. However, this result may be reversed by reversing the signals (8051_EVCC, 30 5 V) on the terminals 58, 100 and reversing the signals (VBATT, POS12V) on the terminals 50, 52.

Figure 7:
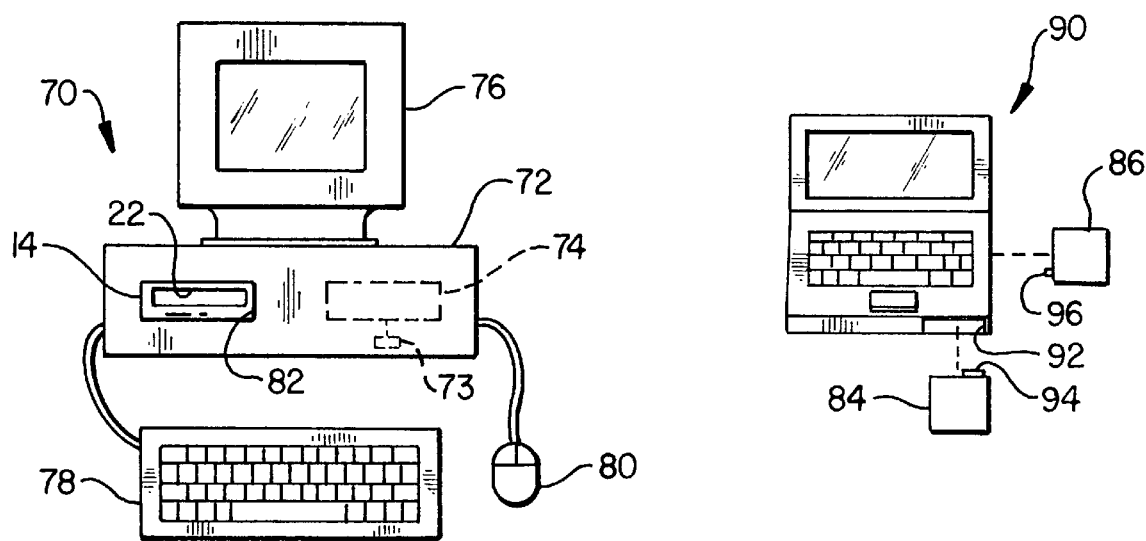
FIG. 7 is a schematic illustration of a method of adapting a desktop computer to operatively receive a multi-purpose bay device therein, the method embodying principles of the present invention.

Referring additionally now to FIG. 7, a standard desktop computer 70 having a CPU 72 of the type well known to those of ordinary skill in the art including a microprocessor 73, internal data storage device or hard disk drive 74 operative to store data that may be retrieved by the microprocessor, monitor 76, keyboard 78 and graphic input device or mouse 80 is representatively illustrated. Additionally, a portable or notebook computer 90 is representatively illustrated. The desktop computer 70 is illustrated as an example of a computer system which includes a standard half-height bay 82, but which is not designed for sue with multi-purpose devices 84, 86. Of course, other computer systems may be used in place of the desktop computer 70, such as an early portable computer having a half-height bay therein, without departing from the principles of the present invention.

The notebook computer 90 includes a multi-purpose bay 92 for operatively receiving the devices 84, 86 therein. In order to permit use of at least the storage media drive device 84 in the desktop computer 70, the adapter 14 is installed in the half-height bay 82. The connectors 32, 36, 40, 42 are connected to the computer 70. Thus, when the device 84 is installed in the adapter 14 multi-purpose bay 22, a connector 94 on the device will connect to connector 30, and will be powered by the computer 70 via the connector 40 and communicate with the computer via connector 32 and connector 36 or 42, depending upon the type of device.

It will be readily appreciated that a large quantity of data may be transferred between the computers 70, 90 by storing the data on the device 84 while it is installed in one of the computers, and then transferring the device to the other computer. If the data is recorded on the device 84 in the notebook computer 90, the device may be subsequently installed in the multi-purpose bay 22, and the data may then be transferred from the device to the hard disk drive 74. The modular design of the multi-purpose device 84 and the multi-purpose bays 22, 92 enables this operation to be performed conveniently.

If the battery device 86 is installed in the computer 70, it will be inoperable, both for charging and discharging. This is due to the fact that the computer 70 does not have any connector for connecting to the connector 38. Thus, installation of the battery device 86 has no effect, even though a connector 96 on the battery is connected to the connector 34 when it is installed in the adapter 14.

Referring again to FIGS. 5 & 6, note that signal 8051_EVCC will be present at terminal 66, and at pin 5 of connector 34, for charging the battery device 86 installed in the adapter 14, but the battery will not be charged unless the connector 38 is connected to a computer system, such as the docking station 10, which includes circuitry for controlling charging and/or discharging of a multi-purpose battery device.

Thus have been described the multi-purpose bay adapter 14 which permits multi-purpose devices 84, 86 to be operatively installed in standard half-height bays 12, 82. The adapter 14 includes the circuit board 28, which has connectors 30, 32, 34, 36, 38, 40, 42 thereon, and which enables the adapter 14 to be used with the computer system 10, designed for use with multi-purpose devices 84, 86, and which enables the adapter 14 to be used with the computer system 70, designed for use with standard half-height drives. The circuit board 28 includes the circuit 44, which senses the environment in which the adapter 14 is installed, and supplies power to the multi-purpose device 84 from an appropriate source.

Of course, a person of ordinary skill in the art would find it obvious to make modifications, additions, deletions, substitutions and other changed to the adapter 14 and computer systems 10, 70 described above, and such changes are contemplated by the principles of the present invention. Accordingly, the foregoing detailed description is to be clearly understood as being given by way of illustration and example only, the spirit and scope of the present invention being limited solely by the appended claims.

What is claimed is:

1. An adapter for operatively receiving a multi-purpose device therein, the adapter being operatively mountable within a standard half-height bay of a computer system and comprising:

a multi-purpose bay formed in the adapter;

a first connector disposed relative to the multi-purpose bay, so that when the multi-purpose device in installed in the multi-purpose bay the multi-purpose device is connected to the first connector;

a second connector configured for connecting the adapter to a computer system standard half-height drive power supply;

a third connector configured for connecting the adapter to a computer system multi-purpose device power supply; and a circuit interconnecting the first, second and third connectors, the circuit comprising first and second gates, the base of the first gate being connected to a first terminal of the second connector, and the base of the second gate being connected to a first terminal of the third connector.

2. The adapter according to claim 1, wherein the first gate connects the first terminal of the third connector to ground when power is supplied to the second connector from the standard half-height drive power supply.

3. The adapter according to claim 1, wherein the second gate is further connected to a second terminal of the third connector, and to a first terminal of the first connector, such that the second terminal of the third connector is connected to the first terminal of the first connector when power is supplied to the third connector from the multi-purpose device power supply and the second connector is disconnected from the standard half-height drive power supply.

4. The adapter according to claim 3, wherein a second terminal of the second connector is connected to the first connector first terminal, the first connector first terminal supplying power to the multi-purpose device when the multi-purpose device is operatively installed within the multi-purpose bay.

5. An adapter for operatively receiving a multi-purpose device therein, the adapter being operatively mountable within a standard half-height bay of a computer system and comprising:

a multi-purpose bay former in the adapter;

a first connector disposed relative to the multi-purpose bay, so that when the multi-purpose device is installed in the multi-purpose bay the multi-purpose device is connected to the first connector;

a second connector configured for connecting the adapter to a computer system standard half-height drive power supply;

a third connector configured for connecting the adapter to a computer system multi-purpose device power supply; and a circuit interconnecting the first, second and third connectors, the multi-purpose device being a battery, and the circuit including a first gate, a base of the first gate being connected to a first terminal of the third connector.

6. The adapter according to claim 5, wherein the first gate connects a second terminal of the third connector to a first terminal of a fourth connector when the third connector is connected to the multi-purpose device power supply, the fourth connector being disposed relative to the multi-purpose bay, so that when the battery is installed in the multi-purpose bay the battery is connected to the fourth connector.

7. The adapter according to claim 6, wherein a first terminal of the second connector is connected to the fourth connector first terminal.

8. A computer system comprising:

a CPU including a microprocessor;

a data storage device operative to store data that may be retrieved by the microprocessor;

a standard half-height bay; and an adapter configured to operatively receive a multi-purpose device therein, the adapter being mounted in the half-height bay, and the adapter including:

a multi-purposes bay formed therein;

a first connector disposed relative to the multi-purpose bay, so that when the multi-purpose device is installed in the multi-purpose bay the multi-purpose device is connected to the first connector;

a second connector configured for connecting the adapter to a computer system standard half-height drive power supply;

a third connector configured for connecting the adapter to a computer system multi-purpose device supply; and a circuit interconnecting the first, second and third connectors, the circuit comprising first and second gates, the base of the first gate being connected to a first terminal of the second connector, and the base of the second gate being connected to a first terminal of the third connector.

9. The computer according to claim 8, wherein the first gate connects the first terminal of the third connector to ground when the second connector is connected to the standard half-height drive power supply.

10. The computer system according to claim 8, wherein the second gate connects a second terminal of the third connector to a first terminal of the first connector when the third connector is connected to the multi-purpose device power supply and the second connector is disconnected from the standard half-height drive power supply.

11. The computer system according to claim 10, wherein a second terminal of the second connector is connected to the first connector first terminal, the first connector first terminal supplying power to the multi-purpose device when the multi-purpose device is operatively installed within the multi-purpose bay.

12. A computer system comprising:

a CPU including a microprocessor;

a data storage device operative to store data that may be retrieved by the microprocessor;

a standard half-height bay; and an adapter configured to operatively receive a multi-purpose device therein, the adapter being mounted in the half-height bay, and the adapter including:

a multi-purposes bay formed therein;

a first connector disposed relative to the multi-purpose bay, so that when the multi-purpose device is installed in the multi-purpose bay the multi-purpose device is connected to the first connector;

a second connector configured for connecting the adapter to a computer system standard half-height drive power supply;

a third connector configured for connecting the adapter to a computer system multi-purpose device supply; and a circuit interconnecting the first, second and third connectors, the multi-purpose device being a battery, and the circuit including a first gate, a base of the first gate being connected to a first terminal of the third connector.

13. The computer system according to claim 12, wherein the first gate connects a second terminal of the third connector to a first terminal of a fourth connector when the third connector is connected to the multi-purpose device power supply, the fourth connector being disposed relative to the multi-purpose bay, so that when the battery is installed in the multi-purpose bay the battery is connected to the fourth connector.

14. The computer system according to claim 13, wherein a first terminal of the second connector is connected to the fourth connector first terminal.

15. An adapter for operatively receiving a multi-purpose device therein, the adapter being operatively mountable within a standard half-height bay of a computer system and comprising:

a multi-purpose bay formed in the adapter;

a first connector disposed relative to the multi-purpose bay so that when the multi-purpose device is installed in the multi-purpose bay the multi-purpose device is connected to the first connector;

a second connector configured for connecting the adapter to a computer system standard half-height drive power supply;

a third connector configured for connecting the adapter to a computer system multi-purpose device power supply; and a circuit interconnecting the first, second and third connectors, the circuit being operative to sense the computer system power supply environment in which it is installed and to:
  (1) route electrical power to the first connector from the second connector when the second connector receives electrical power but the third connector does not,
  (2) route electrical power to the first connector from the third connector when the third connector receives electrical power but the second connector does not, and
  (3) route electrical power to the first connector from only a selected one of the second and third connectors when both of the second and third connectors receive electrical power.

16. A computer system comprising:

a CPU including a microprocessor;

a data storage device operative to store data that may be retrieved by the microprocessor;

a standard half-height bay; and an adapter configured to operatively receive a multi-purpose device therein, the adapter being mounted in the half-height bay, and the adapter including:

a multi-purpose bay formed therein;

a first connector disposed relative to the multi-purpose bay, so that when the multi-purpose device is installed in the multi-purpose bay the multi-purpose device is connected to the first connector;

a second connector configured for connecting the adapter to a computer system standard half-height drive power supply;

a third connector configured for connecting the adapter to a computer system multi-purpose device supply; and a circuit interconnecting the first, second and third connectors, the circuit being operative to sense the computer system power supply environment in which it is installed and to:
  (1) route electrical power to the first connector from the second connector when the second connector receives electrical power but the third connector does not,
  (2) route electrical power to the first connector from the third connector when the third connector receives electrical power but the second connector does not, and
  (3) route electrical power to the first connector from only a selected one of the second and third connectors when both of the second and third connectors receive electrical power.

* * * * *